(12) United States Patent
Liu et al.

(10) Patent No.: US 9,007,892 B2
(45) Date of Patent: Apr. 14, 2015

(54) APPARATUS AND METHOD TO FIND PARTIALLY DISJOINT ROUTES FOR DUAL FIBER-CUTS

(71) Applicant: Futurewei Technologies, Inc., Plano, TX (US)

(72) Inventors: Victor Yu Liu, Oakland, CA (US); Zhicheng Sui, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 135 days.

(21) Appl. No.: 13/662,152

(22) Filed: Oct. 26, 2012

(65) Prior Publication Data

US 2014/0119172 A1  May 1, 2014

(51) Int. Cl.
*H04L 12/703* (2013.01)
*H04L 12/24* (2006.01)
*H04L 12/26* (2006.01)
*H04L 12/735* (2013.01)

(52) U.S. Cl.
CPC ........ *H04L 41/0654* (2013.01); *H04L 43/0811* (2013.01); *H04L 45/128* (2013.01); *H04L 45/28* (2013.01)

(58) Field of Classification Search
CPC ... H04L 43/0811; H04L 45/28; H04L 45/128; H04L 41/0654
USPC .................................. 370/216, 225, 228, 248
See application file for complete search history.

(56) References Cited

U.S. PATENT DOCUMENTS

| | | | | |
|---|---|---|---|---|
| 5,835,482 A | * | 11/1998 | Allen | 370/225 |
| 6,163,525 A | * | 12/2000 | Bentall et al. | 370/227 |
| 6,992,978 B1 | * | 1/2006 | Humblet et al. | 370/228 |
| 7,398,321 B2 | * | 7/2008 | Qiao et al. | 709/239 |
| 7,590,756 B2 | * | 9/2009 | Chan | 709/238 |
| 7,701,848 B2 | * | 4/2010 | Qiao et al. | 370/228 |
| 7,903,564 B2 | * | 3/2011 | Ramakrishnan et al. | 370/238 |
| 8,848,509 B2 | * | 9/2014 | Allan | 370/216 |
| 2002/0172149 A1 | * | 11/2002 | Kinoshita et al. | 370/216 |
| 2003/0063613 A1 | * | 4/2003 | Carpini et al. | 370/401 |
| 2004/0025018 A1 | * | 2/2004 | Haas et al. | 713/168 |
| 2004/0190446 A1 | * | 9/2004 | Ansorge et al. | 370/228 |

(Continued)

OTHER PUBLICATIONS

Dunn, D. Anthony, et al., "Comparison of k-Shortest Paths and Maximum Flow Routing for Network Facility Restoration," IEEE Journal on Selected Areas in Communications, vol. 12, No. 1, Jan. 1994, 12 pages.

(Continued)

*Primary Examiner* — Gary Mui
*Assistant Examiner* — Michael Phillips
(74) *Attorney, Agent, or Firm* — Conley Rose, P.C.; Grant Rodolph; William H. Dietrich

(57) ABSTRACT

A method for protecting a bi-connected network against a dual link failure, the method comprising finding a plurality of cut-pairs for a data flow, finding a work path and a primary backup path for the data flow, determining the cut-pairs that overlap both the work path and the primary backup path, merging the cut-pairs that overlap the work path and the primary backup path into a plurality of cut-groups, wherein each cut-group comprises a first half and a second half, and constructing a plurality of partially disjoint backup paths based on the cut-groups, wherein one of the partially disjoint backup paths protects against the dual link failure that causes a failure on the second half of a first cut-group and a failure on the first half of a second cut-group.

18 Claims, 10 Drawing Sheets

(56) References Cited

U.S. PATENT DOCUMENTS

| | | | |
|---|---|---|---|
| 2007/0110063 A1* | 5/2007 | Tang et al. | 370/390 |
| 2008/0177833 A1* | 7/2008 | Gu et al. | 709/204 |
| 2009/0207728 A1* | 8/2009 | Bryant et al. | 370/225 |
| 2011/0205886 A1* | 8/2011 | Maruyama et al. | 370/225 |
| 2013/0114403 A1* | 5/2013 | Grover et al. | 370/228 |

OTHER PUBLICATIONS

Liu, Victor Yu, et al., "Finding Partially Disjoint Routes for Dual Fiber-Cut Protection on Bi-Connected Networks," OFC/NFOEC Technical Digest 2012, OSA, 3 pages.

Liu, Victor Yu, et al., "Spare Capacity Allocation Using Shared Backup Path Protection for Dual Link Failures," 2011, 8th International Workshop on the Design of Reliable Communications Networks (DRCN), IEEE, 8 pages.

Tsin, Yung H., "Yet Another Optimal Algorithm for 3-Edge-Connectivity," Journal of Discrete Algorithms, May 22, 2008, pp. 130-146.

Bhandari, Ramesh, "Survivable Networks, Algorithms for Diverse Routing," AT&T Laboratories, New Jersey, 1999, 200 pages.

Ahuja, Ravindra K. et al., "Network Flows, Theory, Algorithms, and Applications," Prentice Hall, 1993, 846 pages.

* cited by examiner $k = 1, \ i = 0$ $k = 1, \ i = 1$

APPARATUS AND METHOD TO FIND PARTIALLY DISJOINT ROUTES FOR DUAL FIBER-CUTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks transport data between nodes via links and paths. Networks may be realized using variety of different topologies, such as ring, a multi-ring, partial-mesh, or full-mesh layouts. Today, most large networks, such as optical networks, interconnect their nodes as bi-connected networks. Bi-connected networks provide at least two fully disjoint or mutually independent paths between any two nodes in the network. Other large networks may be tri-connected networks that provide at least three disjoint or mutually independent paths between any two nodes in the network. Both network topologies provide the advantage of employing redundant connections between two nodes.

Networks may suffer from path failures caused by failed nodes or links within the network. Single link failures in networks are common failures that may cause a single path to completely or partially stop transmitting data. A wide variety of path protection schemes enable networks to recover from the single-link failures by assigning backup paths to the working or transmitting path, and thereby improving the resiliency of networks. For instance, one fully disjoint path in a bi-connected network may be assigned as the work path, while the second fully disjoint path may be assigned the primary backup path. When the bi-connected network detects a link failure in the work path, the path protection scheme may reroute the data traffic from the work path to the primary backup path to avoid data loss.

Dual link failures occur less often than single link failures in a network. As a result, path protection schemes that manage dual link failures are not as prevalent as path protection schemes for single link failures. However, dual link failures have become increasingly problematic for networks with large scale deployment and/or networks located in geographical areas susceptible to natural disasters, such as earthquakes. In bi-connected networks, dual link failures may cause both fully disjoint paths between a node pair to fail, and thus may cause outages to segments of the network or the entire network. To alleviate the impact of dual link failures, bi-connected networks may be converted to tri-connected networks with the addition of links and/or nodes. Tri-connected networks can guarantee the existence of three fully disjoint paths, which improves network resilience by providing two backup paths for a work path. Unfortunately, converting bi-connected networks to tri-connected networks is not only time-consuming, but also expensive. Therefore, other low-cost, effective, and easy-to-implement path protection schemes are necessary to minimize the impact of dual link failures on current network systems.

SUMMARY

In one embodiment, the disclosure includes an apparatus comprising a processor configured to find a first cut-pair for a data flow, find a second cut-pair for the data flow, and merge the first cut-pair and the second cut-pair into a cut-group when the first cut-pair and the second cut-pair overlap with each other, wherein failure of either the first cut-pair or the second cut-pair partitions a network comprising a plurality of nodes, and wherein after the partition of the network, some of the nodes cannot communicate with other of the nodes.

In yet another embodiment, the disclosure includes an apparatus comprising a processor configured to discover a first fully disjoint path and a second fully disjoint path for a data flow, wherein the first fully disjoint path and the second fully disjoint path do not overlap with each other, find a plurality of cut-pairs for the data flow, combine the cut-pairs into a plurality of cut-groups, wherein each of the cut-groups comprise a first half and a second half, and construct a first partially disjoint backup path that overlaps one of the halves for each cut-group.

In a third embodiment, the disclosure includes a method for protecting a bi-connected network against a dual link failure, the method comprising finding a plurality of cut-pairs for a data flow, finding a work path and a primary backup path for the data flow, determining the cut-pairs that overlap both the work path and the primary backup path, merging the cut-pairs that overlap the work path and the primary backup path into a plurality of cut-groups, wherein each cut-group comprises a first half and a second half, and constructing a plurality of partially disjoint backup paths based on the cut-groups, wherein one of the partially disjoint backup paths protects against the dual link failure that causes a failure on a second half of a first cut-group and a failure on a first half of a second cut-group.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein is a method and system to maximize the protection against dual link failure by constructing partially disjoint backup paths between two nodes. A data flow between two nodes may comprise cut-pairs. Cut-pairs may be joined together to form cut-groups. To discover and construct partially disjoint backup paths in a data flow, a diverse routing algorithm or disjoint path algorithm, may be used to find fully disjoint paths along the two nodes. One of the fully disjoint paths may be designated the work path, while the second fully disjoint path may be designated the primary backup path. The diverse routing algorithm may remove the forwarding ability along the paths used to construct the work path and primary backup path. Partially disjoint backup paths may be constructed by relaxing or removing the forwarding limitations for different halves of different cut-groups. Afterwards, a partially disjoint backup path may be traced based on the path created by mapping the route data travels in the forward direction. Additional partially disjoint backup paths may be constructed by alternating the halves in the cut-groups that are able to transport data in the forward direction. To ensure dual link failures that occur on different halves of any two cut-groups in a network are protected by a partially disjoint backup path, the number of partially disjoin backup paths may be equal to the number of cut-groups.

Figure 1:
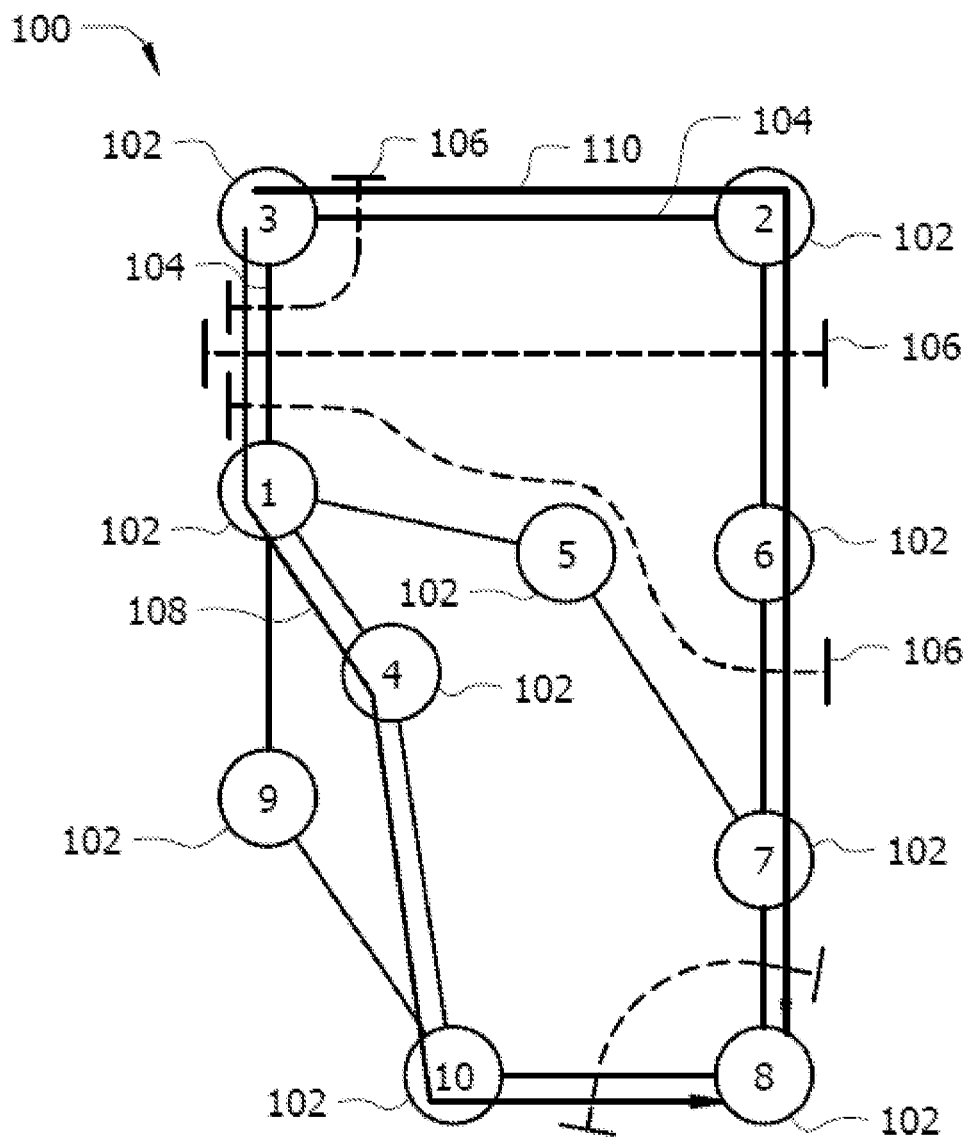
FIG. 1 is a schematic diagram of an embodiment of a bi-connected network that comprises cut-pairs and cut-groups.

FIG. 1 is a schematic diagram of an embodiment of a bi-connected network 100 that comprises cut-pairs and cut-groups. Other embodiments may include other network topologies and layouts, such as tri-connected or full-mesh networks. The bi-connected network 100 may be any network that requires a high level of network reliability and susceptible to dual link failures, such as Internet Protocol (IP), Multiprotocol Label Switching (MPLS), Ethernet, Wavelength Division Multiplexing (WDM), and backbone networks. The bi-connected network 100 may be a network that operates in the electrical, optical, or a combination of both domains. The bi-connected network 100 may comprise a plurality of nodes 102 interconnected with links, such as fiber optic links or electrical links. The bi-connected network 100 may also comprise a plurality of non-overlapping or mutually independent sub-graph networks as explained below. The data frames or packets may be forwarded on a plurality of links that connect multiple nodes 102 along a path 104. Node 102 may include routers, switches, bridges, optical devices or combinations thereof that transport the individual data packets or frames through the network. Each path 104 may connect the nodes and comprise a single link, a series of parallel links, a plurality of interconnected nodes 102, or any combinations thereof used to transport data. Data may be transmitted on path 104 in both directions between two nodes 102. The bi-connected network 100 may offer data services that forward data frames from one node 102 to another node 102 without using pre-configured routes or may forward the data frames along pre-configured or pre-established routes. FIG. 1 also illustrates a work path 108 and a primary backup path 110, which are discussed below.

In FIG. 1, the bi-connected network 100 may couple node 3 102 to node 8 102 where a data flow may be implemented to transport data between the two nodes. The bi-connected network 100 may include a set of cuts-pairs, where each cut-pair comprises two different paths 104. A cut-pair may be a pair of paths 104 that may partition the network into independent sections. In other words, if both paths 104 fail within a cut pair, a section of the network will be completely separated from another section of the network such that some nodes 102 may no longer be able to communicate with other nodes 102 within the bi-connected network 100. In FIG. 1, lines 106 intersect the different paths 104 in the bi-connected network 100 that may be used to form the cut pairs. For example, lines 106 intersects path 104 between node 3 102-node 1 102 and path 104 between node 2 102-node 6 102. Removal of the two paths 104 separates node 3 102 and node 2 102 from the rest of the other nodes 102 in network 100. Other examples of cut-pairs shown with lines 106 are listed as follows: (1) path 104 between node 3 102-node 1 102 and path 104 between node 3 102-node 2 102; (2) path 104 between node 3 102-node 1 102 and path 104 between node 6 102-node 7 102; and (3) path 104 between node 8 102-node 7 102 and path 104 between node 8 102-node 10 102. The list presented above is not exhaustive and additional cut-pairs may be found within FIG. 1. Persons of ordinary skill in the art are aware that a single failure (i.e. bridge link failure) may partition single connected networks (i.e. one fully disjoint path between two nodes).

For conciseness purposes, cut-pairs will be referenced throughout the disclosure as [1-2] (i.e., path between node 1-node 2), [3-4] (i.e., path between node 3-node 4). Hence, as an example, the cut-pair with path 104 between node 3 102-node 1 102 and path 104 between node 3 102-node 2 102 will be referenced as [3-1], [3-2]. Cut-pairs in a network may be discovered using a variety of methods or algorithms, such as the algorithm proposed by T. H. Tsin, and entitled "Yet another optimal algorithm for 3-edge-connectivity," in the Journal of Discrete Algorithms, volume 7, pp. 130-146, 2009, and hereby incorporated by reference. Persons of ordinary skill in the art are aware there other algorithms may be used to discover cut-pairs.

Two or more cut-pairs with a common path 104 may be joined together to form a cut-group for a data flow. A failure in all the paths 104 in a cut-group may have the same effect on the data flow on the bi-connected network 100 when any of the cut pairs in the cut-group fail. Joining cut-pairs into cut-groups may be a transitive operation. For example, a first and a second cut-pair may share a common path 104, and when the second and a third cut-pair also share a common path 104, then all three cut-pairs may belong to the same cut-group for a given data flow. In FIG. 1, cut-pairs [3-1], [3-2]; [3-1], [2-6]; and [3-1], [6-7] all share the common path 104 [3-1]. Hence, all three cut-pairs may be joined together to form the cut-group [3-1], [3-2, 2-6, 6-7]. Paths [3-2], [2-6], and [6-7] may be combined and designated as one path within the cut-group. As such, the cut-group [3-1], [3-2, 2-6, 6-7] has a first path [3-1] 104 and a second path [3-2, 2-6, 6-7] 104.

FIG. 1 also demonstrates that bi-connected network 100 may have a cut-group that includes one cut-pair. For example, cut-pair [10-8], [7-8] does not share or have common paths with other cut-pairs and prevents cut-pair [10-8], [7-8] from being joined with other cut-pairs. When a cut-pair does not share a common path 104 with another cut-pair, the cut-pair may be designated as its own cut-group. Therefore, cut-pair [10-8], [7-8] may be designated as a cut-group [10-8], [7-8] with a first path [10-8] 104 and a second path [7-8] 104.

For notation purposes, the two paths in a cut-group may be referred to as a first half and a second half of the cut-group. The first half of the cut-group represents the first path for the cut-group, while the second half of the cut-group represents the second path for the cut-group. For example, in cut-group [3-1], [3-2, 2-6, 6-7], the first half of the cut-group may reference the first path [3-1] 104, while the second half of the cut-group may reference the second path [3-2, 2-6, 6-7] 104. Designating the two halves of a cut-group may be used to discover and construct partially disjoint paths. For example, one of the halves for a cut-group may be used to identify a path 104 that overlaps a fully disjoint path. Moreover, re-enabling the ability to transfer data in the forward direction for different halves in different cut-group may be used to map out partially disjoint backup path. The construction of partially disjoint backup paths will be discussed in more detail below.

In one embodiment, a network may comprise different sub-graph networks linked together via cut-pairs. A sub-graph network may be a subset of a network where nodes 102 within the sub-graph network are interconnected amongst each other independently from the rest of the network. For example, the bi-connected network 100 includes a sub-graph network that comprises nodes 1, 4, 9, and 10 102. Paths 104 interconnect nodes 1, 4, 9, and 10 102 amongst each other in a closed loop or ring-like fashion. Paths 104 may provide one fully disjoint path between nodes 1, 4, 9, and 10 102. Nodes 1, 4, 9, and 10 102 may communicate amongst each other without transmitting and/or receiving data from other sections of the network, which is a common characteristic for nodes within a sub-graph network. Other embodiments of a sub-graph network may have more than two fully disjoint paths interconnecting each of the nodes 102 in the sub-graph network. For instance, a sub-graph network may be tri-connected and provide at least three fully disjoint paths between any two nodes in the sub-graph network. Sub-graph networks are described in more detail in FIGS. 4-8.

A dual link failure at a cut-pair may partition the bi-connected network 100. In one embodiment, a network may comprise two sub-graph networks connected together via the two paths in a cut-pair. A dual link failure at the cut-pair may completely separate the two sub-graph networks from each other. A dual link failure not located at a cut-pair may not partition the network into different sections. For example, in FIG. 1, a path failure between nodes 1 102 and nodes 5 102, and between nodes 9 102 and node 10 102 will not partition the network. For dual link failures that do not partition the network 100, partially disjoint backup paths may be used as secondary backup paths to transport data between two nodes in a network. Discovering and constructing partially disjoint backup paths will be discussed in more detail below.

Figure 2A:
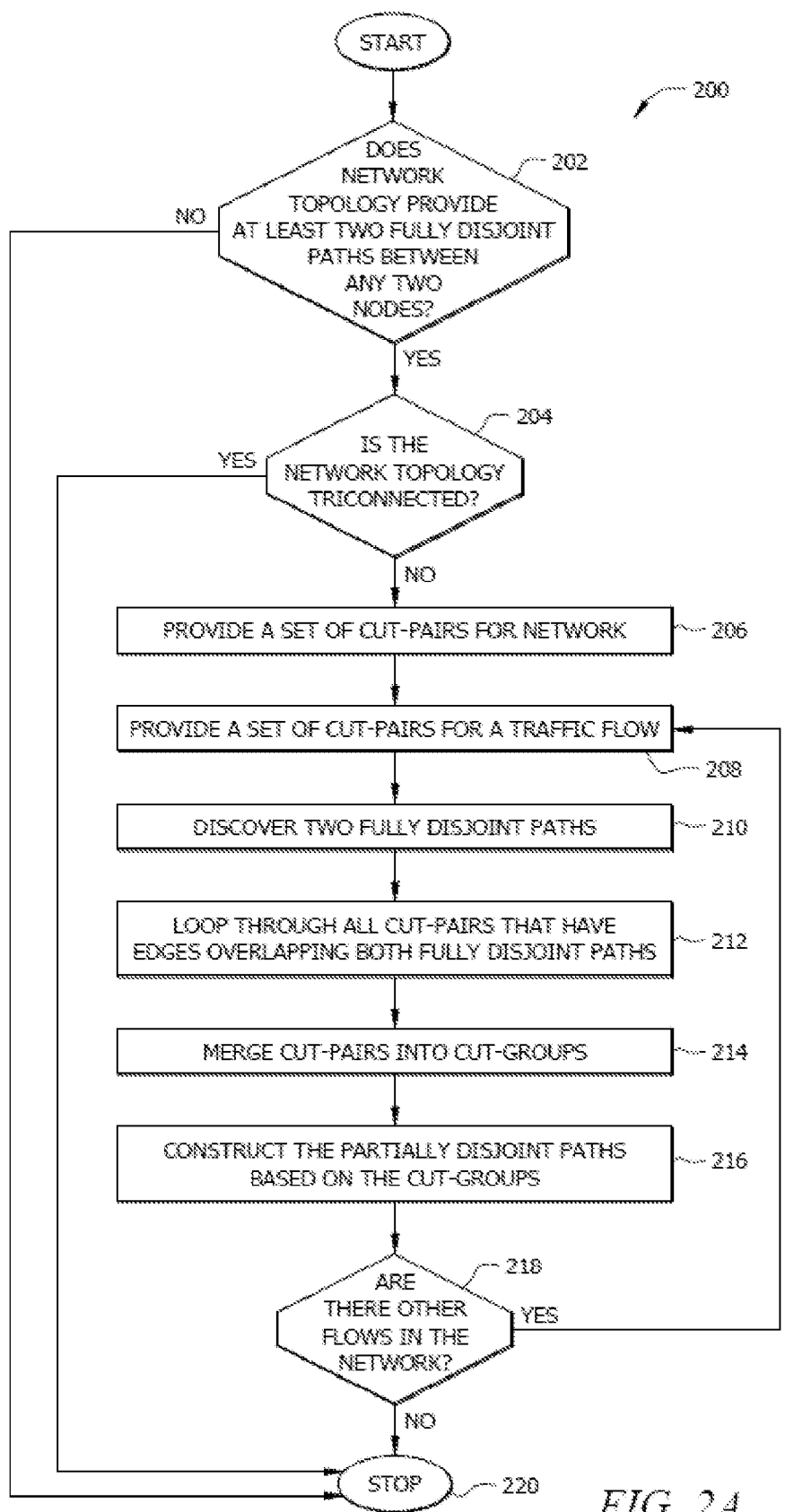
FIG. 2A is a flowchart of an embodiment of a method that discovers a plurality of partially disjoint backup paths.

FIG. 2A is a flowchart of an embodiment of a method 200 that discovers a plurality of partially disjoint backup paths. Discovery and construction of the partially disjoint paths may be used to protect a network against dual link failures. Method 200 may be implemented in a variety of network layouts, such as a ring topology or the network topology illustrated in FIG. 1. For a given network topology, the network may include a set of nodes and a set of links connecting any two nodes. In one embodiment, method 200 may discover and construct partially disjoint backup paths to protect any dual link failures impacting the different halves of any two cut-groups in a bi-connected network. Dual link failures that cause any single cut-pair to fail cannot be protected by partially disjoint backup paths.

The method 200 may start at block 202, where the method 200 may determine whether the network's topology maintains at least two fully disjoint paths for every node pair. If the network topology fails to maintain at least two fully disjoint paths for every node pair, then method 200 proceeds to block 220 and stops. Otherwise, method 200 continues to block 204. For network 100 shown in FIG. 1, block 202 may determine that each node 102 has at least two fully disjoint paths to any of the other nodes 102. For example, to transport data from node 3 102 to node 8 102 in FIG. 1, node 3 102 may transmit data through node 2 102 or through node 1 102 to reach node 8 102. As a result, node 3 102 may have two fully disjoint paths to node 8 102. Persons of ordinary skill in the art are aware that a variety of diverse routing or disjoint path algorithms may be used to determine whether a network is at least bi-connected amongst every node pair.

At block 204, the method 200 may determine whether the network is a tri-connected network in that the network maintains at least three fully disjoint paths for every node pair. For example, block 204 may determine that some nodes 102 in FIG. 1 may have three or more fully disjoint paths (e.g. node 1 102 to node 7 102), while other nodes 102 may have only two fully disjoint paths (e.g. node 3 120 to node 8 102). Block 204 may not categorize network 100 as a tri-connected network because all nodes 102 in network 100 do not have three or more fully disjoint paths for every node pair. An embodiment to implement block 204 may be to use a diverse routing algorithm that employs a maximum flow based algorithm, such as the shortest augmenting path algorithm, to determine the number of fully disjoint paths. The maximum flow based algorithm may be used to discover fully disjoint paths when a network contains trap topologies. If the network is a tri-connected network, method 200 may move to block 220 and stop. However, if the network is only bi-connected and not tri-connected, then method 200 may proceed to block 206. Persons of ordinary skill in the art are aware that partially disjoint backup paths may also be discovered for tri-connected networks, and are not just limited to bi-connected networks.

At block 206, an algorithm, such as the one proposed by T. H. Tsin and mentioned above, may provide all the cut-pairs for the network. As discussed earlier, a cut-pair may be found by removing two paths and determining if the removal of the two paths partitions the network into separate sections. In one embodiment a network may comprise a set of sub-graph networks that do not overlap or share the same nodes in the network. Nodes within a sub-graph network may be interconnected to have more than two fully disjoint paths (e.g., a full-mesh network). However, the non-overlapping sub-graph networks may be bi-connected amongst each other. In some embodiments, the bi-connections between sub-graph networks may be cut-pairs. Thus, removal of the paths within in the cut-pair may separate one sub-graph network from another sub-graph network. Persons of ordinary skill in the art are aware there are other algorithms that may be used to discover cut-pairs.

After discovering all the cut-pairs for the network, the method 200 continues to block 208 to determine a subset of cut pairs that correspond to a given data flow. A network may comprise a plurality of data flows between nodes in the network. Block 208 may select the pertinent cut-pairs that are relevant to the nodes and paths for a given data flow. The given data flow may have an endpoint node designated as the source node, and another endpoint node as the destination node. Data transmitted toward the destination node may be labeled the forward direction, while data transmitted toward the source node may be labeled the reverse direction. For example, in FIG. 1, node 3 102 may be designated as the source node and node 8 102 may be designated as the destination node for a data flow between node 3 102 to node 8 102. Data transmitted from node 3 102 to node 8 102 may be traveling in the forward direction, and the data transmitted from node 8 102 to node 3 102 may be traveling in the reverse direction. In one embodiment, block 208 may select all the cut-pairs within a network when the network has one data flow.

The method 200 then continues to block 210 to discover two fully disjoint paths for a data flow from the source node to the destination node. As discussed earlier, any diverse routing algorithm may be used to determine two fully disjoint paths for a bi-connected network. One embodiment may use a diverse routing algorithm that utilizes a maximum flow based algorithm. Different algorithms may yield discovering different fully disjoint paths for a given data flow. Regardless of the discovered disjoint paths from a diverse routing algorithm, the cut-pairs for a given flow may be the same. After discovering the fully disjoint paths, one of the fully disjoint paths may be designated as the work path, while the second path may be designated as the primary backup path. In FIG. 1, path 108 may be the work path, while path 110 may be designated the primary backup path. The work path may be the path that primarily transports data for the given flow. Whenever the work path fails (e.g. single link failure), traffic may be rerouted from the work path to the primary backup path. Assigning which fully disjoint path is the work path and the primary backup path may be done in variety of methods, such as bandwidth capacity, traffic congestion, or connection priority. After the work path and the primary backup paths have been discovered and constructed, method 200 proceeds to block 212.

Block 212 may determine whether the cut-pairs designated for a given data flow have paths that overlap both the work path and primary backup path. For example, in FIG. 1, for cut pair [3-1], [3-2], block 212 may check whether path [3-1] 104 and path [3-2] 104 overlap the work path 108 and/or a primary backup path 110. Block 212 may determine path [3-1] 104 overlaps the work path 108 and path [3-2] 104 overlaps the primary backup path 110. Some cut-pairs may have paths that overlap only the work path or only the primary backup path. Cut-pair [3-2], [2-6] and [2-6], [6-7] in FIG. 1 have paths [3-2], [2-6], and [6-7] 104 that may overlap only the primary backup path 110. Block 212 may continue to analyze each cut-pair (e.g. loop through the cut-pairs) for the given data flow to determine whether the cut-pair has a path that overlaps the work path, and another path that overlaps the primary backup path. Method 200 may not utilize cut-pairs that do not have paths that overlap both the work path and the primary backup path. As a result, cut-pair [3-2], [2-6] and [2-6], [6-7] may be excluded at as the method 200 continues to block 214.

After determining cut-pairs that have paths overlapping both the work path and primary backup path, method 200 progresses to block 214 to merge the overlapping cut-pairs into cut-groups. As discussed above, any two cut-pairs with overlapping paths may be merged into the same cut-groups. In one embodiment of block 214, the cut-groups may have their first halves indicate the path that overlaps the work path, while the second halves may indicate a path that overlaps the primary backup path. Using FIG. 1 as an example, cut-group [10-8], [7-8] may have its first half [10-8] overlap the work path 108, while the second half of the cut-group [7-8] may overlap the primary backup path 110. The embodiment may sort and list the cut-groups by their distance or proximity from the source node. Other sorting methods or algorithms may be used and are known by persons of ordinary skill in the art. In FIG. 1, the two cut-groups may be sorted in a list as {[3-1], [3-2, 2-6, 6-7]; [10-8], [7-8]} when node 3 102 is designated as the source node.

After the obtaining the cut-groups, the method 200 proceeds to block 216. At block 216, method 200 discovers and constructs partially disjoint backup paths to form secondary backup paths. One embodiment of block 216 may create partially disjoint backup paths by routing the partially disjoint backup paths through the paths in the first half of a cut-group and the paths in the second halves of other cut-groups. One embodiment of block 216 may be found in FIG. 2B. More details in discovering and constructing partially disjoint backup paths will be discussed below. Subsequent to discovering and constructing partially disjoint backup paths for a given data flow, method 200 may proceed to block 218. Block 218 determines whether other data flows exist in the network that still need to discover partially disjoint backup paths. Method 200 returns to block 208 if partially disjoint backup paths have not been constructed for all data flows in the network; otherwise, method 200 continues to block 220 and stops when no other partially disjoint paths need to be computed for other data flows.

Figure 2B:
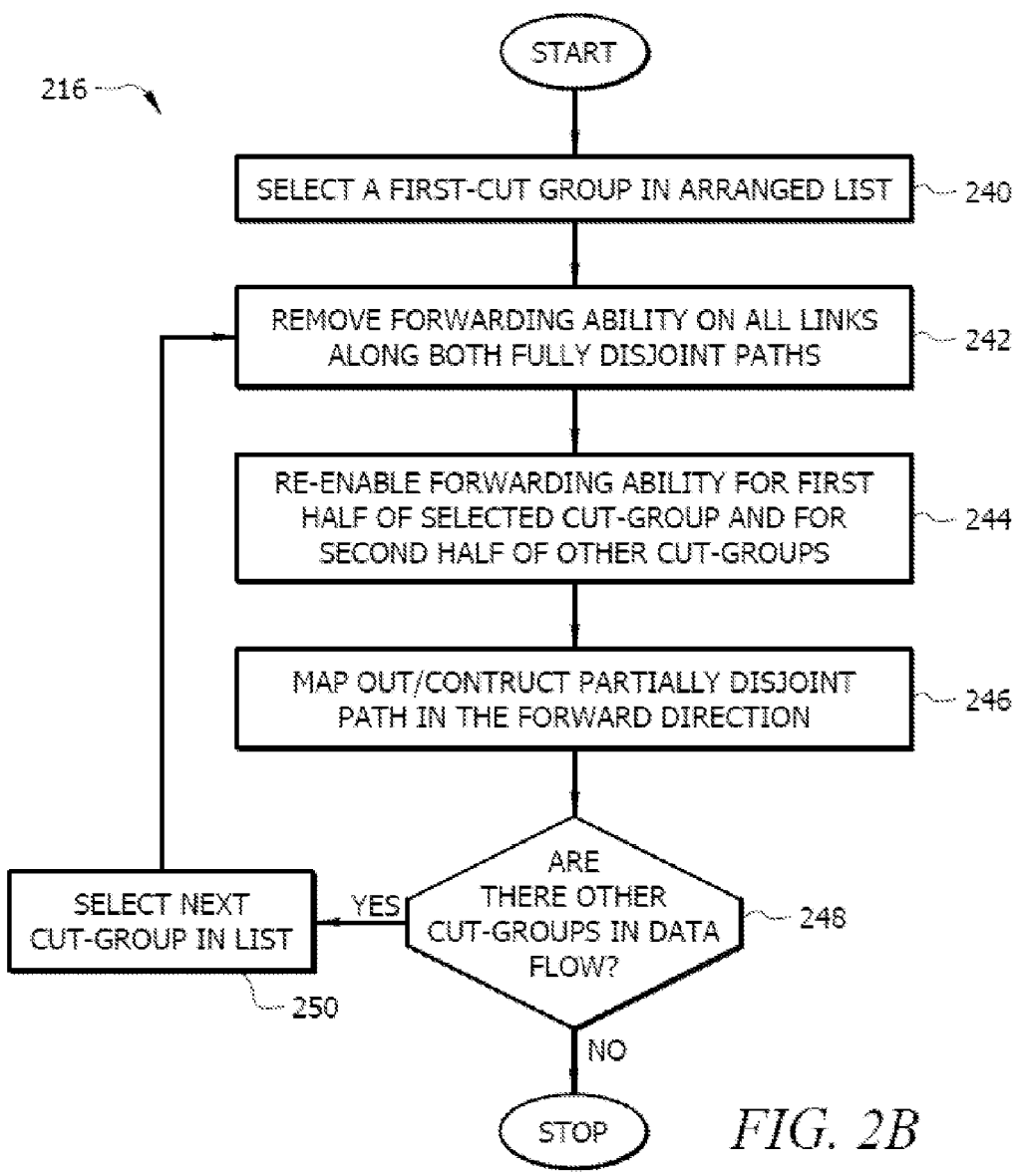
FIG. 2B is a flowchart of an embodiment of block 216 used to discover and construct partially disjoint backup paths for a data flow.

FIG. 2B is a flowchart of an embodiment of block 216 used to discover and construct partially disjoint backup paths for a data flow. At block 240, the first cut-group may be selected from the list created in block 214. As stated above, the first cut-group may be the cut-group closest to the source node for a given data flow. Using FIG. 1 as an example, the first selected cut-group may be [3-1], [3-2, 2-6, 6-7].

The method 200 then continues to block 242 and removes the ability to transport data in the forward direction for all links along the work path and the primary backup path. The work path and the primary backup paths may be designated to transport data in the forward direction for a given flow. Therefore, limiting the forwarding ability for links along the two paths ensures discovery and construction of fully disjoint path. For example, work path 108 in FIG. 1 transports data from node 3 102 through nodes 1, 4, 10 102 to reach node 8 102 (i.e., [3-1-4-10-8]). The arrow head represents a data transmission in the forward direction. As a result, block 242 may limit the forwarding ability for path [3-1-4-10-8] (i.e., the work path 108). More specifically, path [3-1] 104 may no longer transmit data in the forward direction and prevents the discovery and construction of other paths, such as [3-1-9-10-8], as a second fully disjoint path. Both paths [3-1-4-10-8] and [3-1-9-10-8] utilizes path [3-1] 104, and thus are not two fully disjoint paths. As discussed earlier, a variety of methods and algorithms may be used to discover fully disjoint paths. The methods and algorithm may be used to remove the forwarding ability along both the work path and primary backup path.

Method 200 then proceeds to block 244 to re-enable the forwarding ability for the first half of the selected cut-group and for the second halves of the other cut-groups. The cut-groups created in block 214 may have their first halves indicate the paths that overlap the work path, while the second halves may indicate paths that overlap the primary backup path. Re-enabling the forwarding ability for different halves for different cut-groups enables discovery of partially disjoint paths. Using FIG. 1 as an example, re-enabling the first half of the selected cut-group [3-1], [3-2, 2-6, 6-7] and the second half of the cut-group [10-8], [7-8] allows paths [3-1] and [7-8] 104 to transport data in the forward direction. The method then progresses to block 246.

At block 246, the partially disjoint backup path may be constructed by mapping out a route from the source node to the destination in the forward direction. As discussed above, paths [3-1] and [7-8] 104 from cut-groups [3-1], [3-2, 2-6, 6-7] and cut-group [10-8], [7-8] may transport data in the forward direction. A partially disjoint backup path [3-1-5-7-8] may be constructed using the paths [3-1] and [7-8] 104. From block 246, method 200 continues to block 248 to determine if other cut-groups besides the selected cut-groups exist in the list. The selected cut-groups may include the current selected cut-group and previously selected cut-group(s). When other cut-groups exist, then method 200 proceeds to block 250 and selects the next cut-group in the list and returns to block 242. Otherwise, the method 200 stops. Using FIG. 1's cut-group list of {[3-1], [3-2, 2-6, 6-7]; [10-8], [7-8]}, cut-group [10-8], [7-8] would be selected as the next cut-group.

FIG. 2B illustrates that a partially disjoint backup path may be created for the first half of each cut-group. For k cut-groups, i partially disjoint backup paths may be formed when 2≤i≤k. Discovery and construction of the partially disjoint backup paths may depend on the layout of work path and the primary backup path discovered in block 210. In some embodiments, more than one combination of two disjoint paths may exist for a network. Thus, a plurality of different combinations of partially disjoint backup paths may be constructed based on the work path and primary backup paths constructed using the different diverse routing algorithms.

Figure 3:
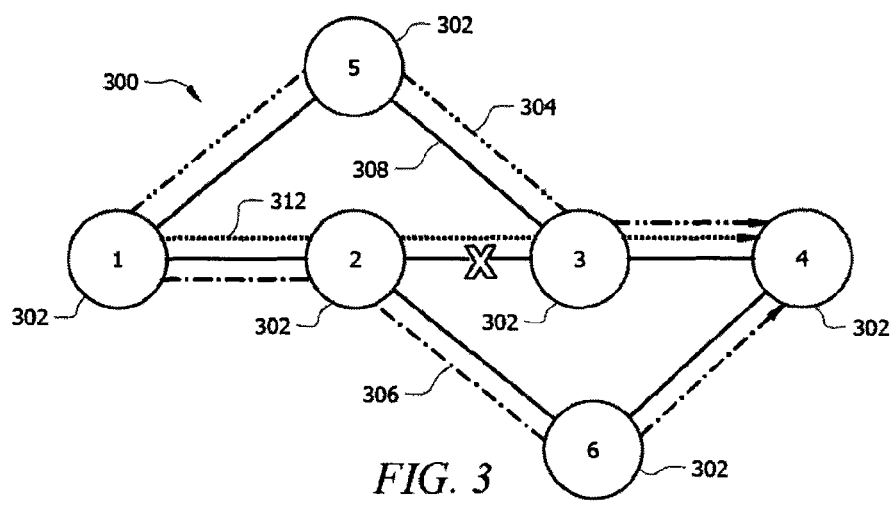
FIG. 3 is a schematic diagram of an embodiment of another network.

FIG. 3 is a schematic diagram of another embodiment of a network 300. Network 300 comprises nodes 302 that may be interconnected using links 308 and that transport data. Node 1 302 may also be designated the source node, while node 4 302 may be the destination node. For a data flow from node 1 302 to node 4 302, a work path 304 and a primary backup path 306 may be discovered using a diverse routing algorithm or disjoint path algorithm. In one embodiment, the diverse routing algorithm may utilize a maximum flow algorithm, such as the shortest augmenting path algorithm, and thereby may set the link capacity for each link 308 as one unit. Therefore, each flow from node 1 to node 4 may provide one unit of bandwidth. Hence, the maximum flow algorithm may maximize the bandwidth for a flow by constructing a work path 304 and a backup path 306, where each path provides a link capacity of one unit.

Referring back to FIG. 2A, block 210 may encounter network topologies that include trapped paths. Trapped paths may be paths that prevent the creation of two fully disjoint paths for a bi-connected network. FIG. 3 also illustrates that the creation of trapped path 312 may prevent the discovery and construction of the work path 304 and the backup path 306. Trapped path 312 may transport data between node 1 302, node 2 302, node 3 302, and node 4 302. However, after removing the forwarding ability for links 308 that interconnect the nodes, no other paths may be constructed to transport data in the forward direction for the data flow. Specifically, the other network paths, such as work path 304 and primary backup path 306, may overlap a portion of the trapped path 312. In FIG. 3, backup path 306 overlaps trapped path 312 between node 1 302 and node 2 302, and work path 304 overlaps trapped path 312 between node 3 302 and node 4 302. Therefore, the diverse routing algorithm may exclude trapped path 312 as a viable fully disjoint path. Additionally, as shown in FIG. 3, the maximum flow based algorithm may exclude the use of trapped link 308 between node 2 302 and node 3 302 to prevent the creation of other trapped paths. For example, a path that travels from node 1 302 to nodes 5, 3, 2, 6, and 4 302 also produces a trapped path that prevents the discovery of two fully disjoint paths.

Figure 4:
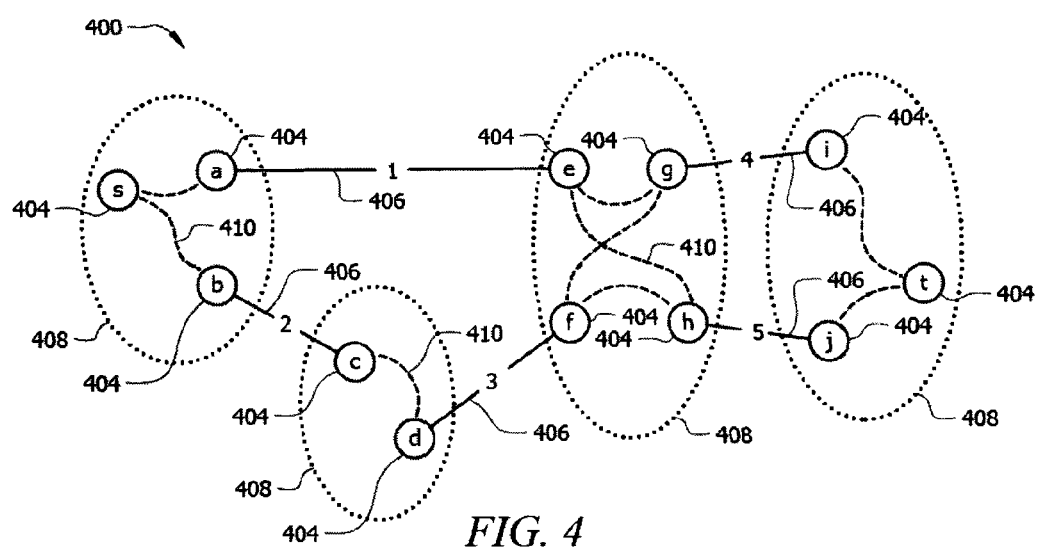
FIG. 4 is a schematic diagram of another embodiment of a network with sub-graph networks.

FIGS. 4-8 are a schematic diagram of another embodiment of a network 400 with sub-graph networks 408. Recall that a sub-graph network 408 may be portion of the network that may have paths that connect nodes 404 independently from other nodes 404 within network 400. Network 400 may comprise nodes a-j, s, and t 404 that may be used to form a plurality of sub-graph networks 408. A subset of all the nodes in network 400, such as nodes s, a, and b 404, are coupled together to form one sub-graph network 408. Other sub-graph networks 408 may be formed using other subsets that include different nodes. FIG. 4 illustrates the formation of other sub-graph networks 408 by coupling nodes c and d 404, nodes e, f, g, and h 404, or nodes i, j, and t 404. As such, the nodes 404 within the sub-graph networks 408 may communicate with each without using paths from other sub-graph networks 408. Moreover, because different nodes in network 400 form different sub-graph networks 408, the sub-graph networks 408 illustrated in FIG. 4 may be considered non-overlapping sub-graph networks 408.

Figure 5:
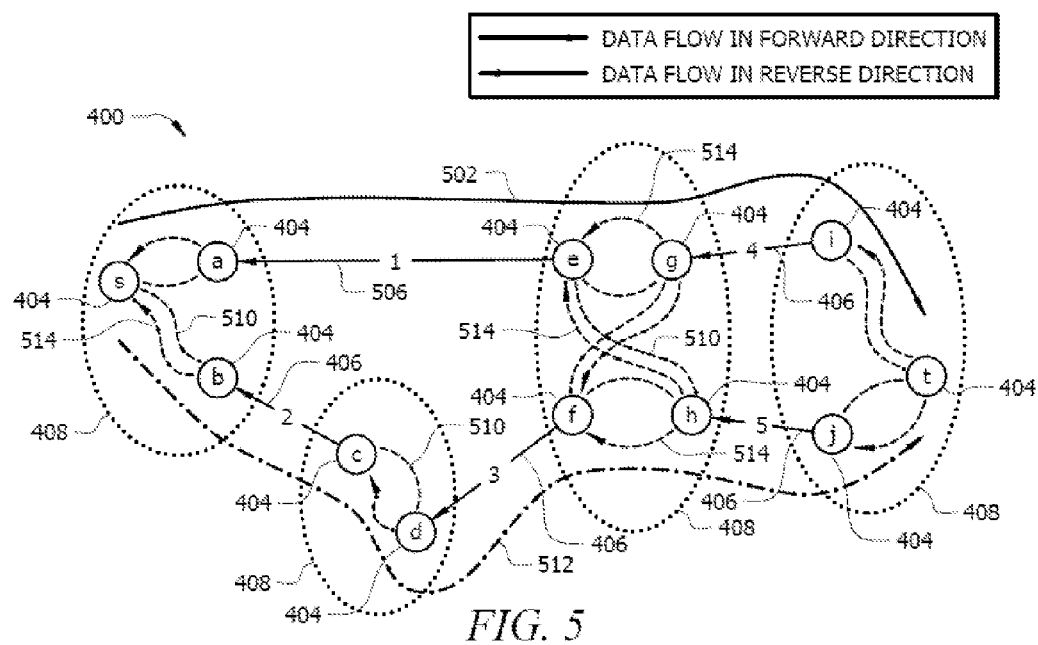
FIG. 5 is a schematic diagram of an embodiment of a network after placing limitations on the forwarding ability of paths.
Figure 6:
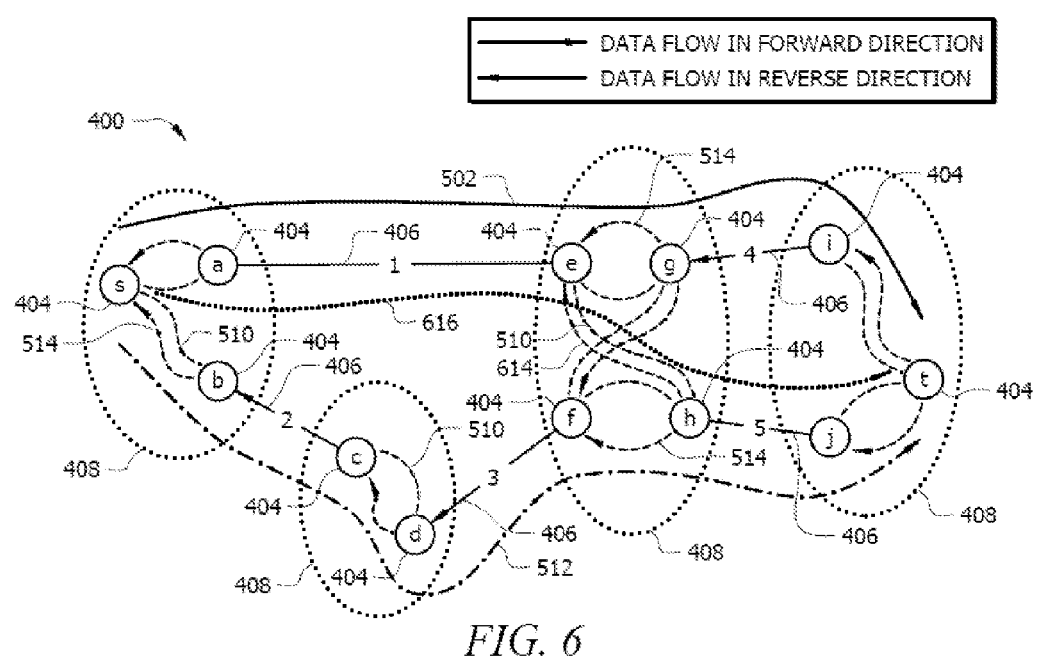
FIG. 6 is a schematic diagram of an embodiment of a network with a secondary backup path.
Figure 7:
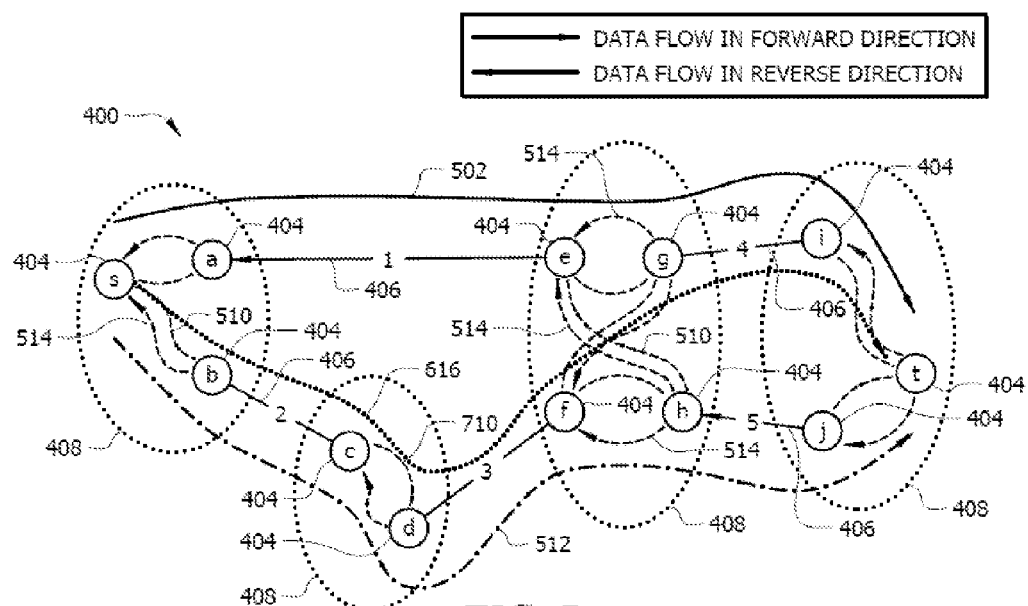
FIG. 7 is a schematic diagram of another embodiment of a network with a secondary backup path.
Figure 8:
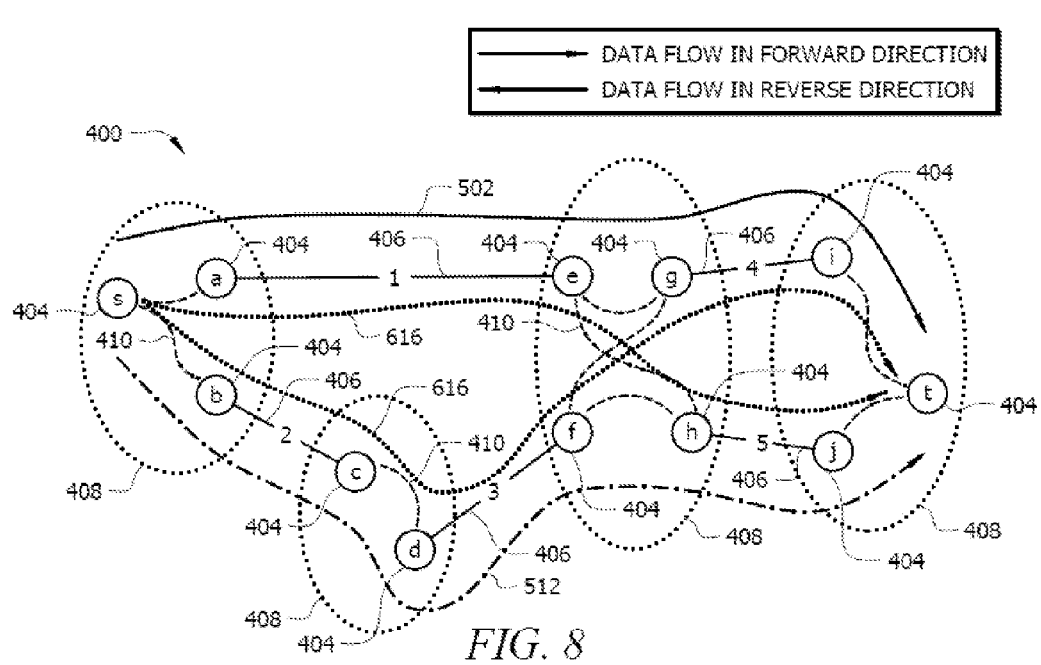
FIG. 8 is a schematic diagram of another embodiment of a network allocated with two secondary backup paths.

Nodes 404 within the sub-graph networks 408 may be coupled using a tri-connected path 410. FIGS. 4 and 8 illustrate tri-connected paths 410 using dashed lines. FIGS. 5-7 illustrate dashed lines for path 514 and bi-connected path 510 that may be used to form a tri-connected path 410 shown in FIGS. 4 and 8. The tri-connected path 410 within sub-graph networks 408 may comprise internal nodes and/or links, not shown in FIG. 4, to produce three fully disjoint paths between nodes 404. When one of the fully disjoint paths within tri-connected path 410 fails, traffic may be diverted to the other two fully disjoint paths. For example, a tri-connected path 410 connects node s 404 and node a 404. When one of the fully disjoint paths fails, node s may still transport data to node a 404 using two other fully disjoint paths within tri-connected path 410. A plurality of interconnected internal nodes and links may exist between node s 404 and node a 404 similar to the nodes 102 between node 3 102 and node 8 102 in FIG. 1. FIG. 4 illustrates another tri-connected path 410 between node s to node b 404. Hence, node s may be able to form six fully disjoint paths within sub-graph network 408 and network 400. FIG. 4 also illustrates that network 400 comprises non-overlapping sub-graph networks 408 that are connected to each other via single paths 1-5 406, which are shown with solid lines. Single paths 1-5 406 may provide only one fully disjoint path between the sub-graph networks 408. For example, single path 1 406 connects node a 404 and node e 404 together. When a single link failure occurs at single path 1 406, traffic cannot be rerouted to another direct path between node a 404 and node e 404.

Network 400 may have data flow between node s 404 and node t 404. Node s 404 may be designated the source node and node t 404 may be designated the destination node. FIGS. 5-8 depict data transmitted in the direction of node t 404 may be designated as data traveling in the forward direction, while data transmitted in the direction of node s 404 may be designated as data traveling in the reverse direction. Tri-connected paths 410 and single path 406 may be configured to transmit data in both the forward and reverse direction. In addition, FIGS. 5-8 show a work path 502 and a primary backup path 512.

In FIGS. 4-8, network 400 may include the following cut pairs: [a-e], [b-c]; [a-e], [d-f]; [b-c], [d-f]; and [g-i], [h-j]. For network 400, removal of the single paths 406 within a cut-pair may partition the network by separating sub-graph networks 408 from each other. For example, removing single paths [a-e] and [b-c] 406 in cut-pair [a-e], [b-c] may segregate the sub-graph network 408 that includes nodes s, a, and b 404 from the other sub-graph networks 408. Removing two paths within the sub-graph network where the nodes 404 are tri-connected may not partition the network. For example, in FIGS. 5-7, path 514 and bi-connected path 510 that are between [s-a] provide three fully disjoint paths between node s 404 and node a 404. Path 514 and bi-connected path 510 between [s-b] may also provide three fully disjoint paths between node s 404 and node b 404. Removing one of the paths (e.g. path 514) between [s-a] and one of the paths (e.g. path 514) between [s-b] may not partition network because two other fully disjoint path (e.g. bi-connected path 510) exists for both [s-a] and [s-b]. Hence, [s-a], [s-b] may not be categorized as a cut-pair.

In reference to block 212 from FIG. 2A, cut-pairs [b-c], [d-f] may be excluded from the process of discovering and constructing partially disjoint paths. Both single paths [b-c] and [d-f] 406 may overlap the primary backup path 512, but none of the single paths 406 in cut-pair [b-c], [d-f] may overlap the work path 502. Other cut-pairs, [a-e], [b-c]; [a-e], [d-f]; and [g-i], [h j] includes paths that overlap both the work path 502 and primary backup path 512. Furthermore, in reference to block 214 from FIG. 2A, cut pairs [a-e], [b-c] and [a-e], [d-f] may be merged into a cut-group. Cut pairs [a-e], [b-c] and [a-e], [d-f] both include the single path 1 406 (i.e., [a-e]), and thus may have paths that overlap. The two cut pairs may be grouped together to form cut-group [a-e], [b-c, d-f]. Cut-pair [g-i], [h j] may not have a single path 406 that overlaps other single paths 406 from other cut-pairs. As discussed earlier, cut-pairs that do not have overlapping edges with other cut-pair may be designated as a cut-group. Thus, FIGS. 5-8 depicts two cut-groups, [a-e], [b-c, d-f] and [g-i], [h j] that may be used to form partially disjoint backup paths.

FIG. 5 is a schematic diagram of an embodiment of network 400 after placing limitations on the forwarding ability of single paths 406 and paths 514. At this point, the state of network 400 may be equivalent to block 242 in FIG. 2B, where a diverse routing algorithm has discovered and constructed a work path 502 and primary backup path 512. The work path 502 may transport data through nodes s, a, e, g, i, and t 404, while the primary backup path 512 may transport data through nodes s, b, c, d, f, h, j, and t 404. FIG. 5 illustrates arrow heads for the work path 502 and the primary backup path 512 that points toward node t 404. The arrow heads represent the diverse routing algorithm has allocated bandwidth for the work path 502 and primary backup path 512 to transport data in the forward direction. The diverse routing algorithm may have used single paths 406 and paths 514 to construct work path 502 and primary backup path 512. As a result of allocating the forward bandwidth to work path 502 and primary backup path 512, single paths 406 and paths 514 may no longer be used to construct additional fully disjoint path that transports data in the forward direction.

FIG. 5 illustrates arrow heads for single paths 406 and paths 514 that point towards node s 404 or in the reverse direction. As discussed above, the diverse routing algorithm may limit the forwarding ability along links or paths to discover additional fully disjoint path. Although the diverse routing algorithm may no longer utilize the forward bandwidth for single paths 406 and paths 514 to construct additional fully disjoint path, the algorithm may potentially be able to discover paths that utilize the reverse direction bandwidth from single paths 406 and paths 514. For example, the diverse routing algorithm may construct a path that transports data from node t 404 to node s 404 (i.e. the reverse direction) using nodes j, h, f, d, c, and b 404. The arrows heads in FIG. 5 represent that the single paths 406 and paths 514 may be able to allocate bandwidth in the reverse direction, but not in the forward direction. As shown in FIG. 5, no additional fully disjoint paths that transport data in the forward direction may be discovered for network 400 subsequent to constructing the work path 502 and primary backup path 512.

In FIG. 5, paths 514 may represent one of the fully disjoint paths from a tri-connected path (e.g. tri-connected path 410 shown in FIG. 4), and may transmit data only in the reverse direction between nodes s 404 and node t 404 after constructing the work path 502. Data may be re-directed to corresponding bi-connected path 510 when a failure occurs in path 514. The bi-connected path 510 represents the other two fully disjoint paths of a tri-connected path (e.g. tri-connected path 410 shown in FIG. 4) between two nodes (e.g. node s and a 404). For example, FIG. 4 illustrates that node s 404 and node a 404 are coupled together using a tri-connected path 410. The tri-connected path 410 may comprise path 514 and bi-connected path 510 that are between node s 404 and node a 404. Path 514 represents one of the fully disjoint paths and the bi-connected path 510 represents the two other paths between node s 404 and node a 404. If path 514 fails between node s 404 and node a 404, then traffic may be rerouted to the bi-connected path 510 between the two nodes 404. The bi-connected path 510 may comprise two fully disjoint paths, where each fully disjoint path is configured to transmit data in the reverse and forward directions between nodes 404. Hence, combining paths 514 and bi-connected paths 510 between each node 504 may form a tri-connected path 410 illustrated in FIG. 4.

FIG. 6 is a schematic diagram of an embodiment of a network 400 with a secondary backup path 616. The secondary backup path 616 may be a partially disjoint backup path that comprises single paths 406 that overlap both the work path 502 and primary backup path 512. The secondary backup path 616 transmits data through nodes s, a, e, h, j, and t 404 in the forward direction. Referring back to block 214 from FIG. 2A, a cut-group list may be created based on the cut-groups proximity to the source node for a flow. In FIG. 6, node s 404 may be designated the source node, and thus the list may have cut-group [a-e], [b-c, d-f] as the first cut-group and [g-i], [h j] as the second cut-group.

FIG. 6 removes the arrow heads for single paths [a-e] and [h j] 406 to illustrate the single paths 406 may transport data in the forward direction. In other words, single paths [a-e] and [h j] 406 no longer allocate the forward bandwidth to the work path 502 or primary backup path 512. To create the secondary backup path 616, the forwarding ability for one of the halves of each cut-group may be re-enabled. Referring to block 244 of FIG. 2B, the first half of cut-group [a-e], [b-c, d-f] (i.e., [a-e]) and the second half of cut-group [g-i], [h j] (i.e. [h-j]) are re-enabled to transport data in the forward direction. The secondary backup path 616 may be mapped out by tracing a path in the forward direction.

FIG. 7 is a schematic diagram of another embodiment of a network 400 with a secondary backup path 616. FIG. 7 depicts the state of a network 400 subsequent to completing blocks 248 and 250 in FIG. 2B. Secondary backup path 616 may transport data through nodes s, b, c, d, f, g, i, and t 404 using paths [b-c, d-f] and [g-i]. Referencing blocks 242-246 from FIG. 2B, the forwarding limitation may be removed for single paths [b, c], [d, f], and [g, i] 406. As shown in FIG. 7, arrow heads for single paths [b, c], [d, f], and [g, i] 406 do not exist, while single paths [a-e] and [h-j] 406 have arrows pointing in the reverse direction. Single paths [b, c], [d, f] 406, may be the second half of the first cut-group [a-e], [b-c, d-f] and single path [g, i] 406 may be the first half of the second cut-group [g-i], [h-j]. Relaxing the forwarding limitations (i.e. removing forward bandwidth designations) for different halves of the first and second cut-groups may create a secondary backup path 616 between nodes s 404 and node t 404.

FIG. 8 is a schematic diagram of another embodiment of a network 400 allocated with two secondary backup paths 616. FIG. 8 illustrates the state of network 400 when method 200 reaches block 220. After discovering the partially disjoint backup paths for network 400, the forwarding limitations placed on the single paths 406 and tri-connected paths 410 may be removed. The two secondary backup paths 616 shown in FIG. 8 may be used to protect dual link failures that occur on different halves of both cut-groups. One secondary backup path 616 transports data through nodes s, a, e, h, j, and t 404 using paths [a-e] and [h-j], and an additional secondary backup path 616 that transports data through nodes s, b, c, d, f, g, i, and t 404 using paths [b-c, d-f] and [g-i]. Traffic may be rerouted to the secondary backup path when both the work path 502 and primary backup path 502 fail.

As mentioned earlier, one partially disjoint backup path may be discovered and constructed for the first half of each cut-group within a network. For k cut-groups, i partially disjoint backup paths may be formed when 2≤i≤k. However, different embodiments may exist when k=1. When k=1, a network may have i values of zero, one, and two. Discovery and construction of the partially disjoint backup paths may depend on the network topology and the available paths between nodes in the network.

Figure 9:
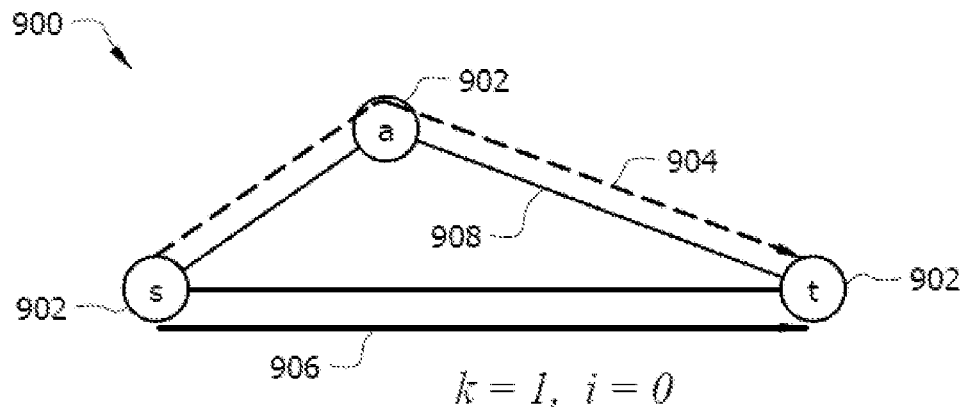
FIG. 9 is a schematic diagram of embodiment of a network 900 with a k value of one and an i value of zero.

FIG. 9 is a schematic diagram of embodiment of a network 900 with a k value of one and an i value of zero. A primary backup path 904 may be constructed through paths [s-a] and [a-t] 908, while the work path 906 may be constructed through paths [s-t] 908. In FIG. 9, illustrates two cut pairs, [s-a], [s-t] and [a-t], [s-t]. Each cut-pair may have one path that overlaps the work path 906 and the primary backup path 904. The cut-pairs share the common path [s-t] 908, and therefore may be combined to form one cut-group [s-a, a-t], [s-t] (i.e., k=1). After constructing and discovering the work path 906 and primary backup path 904, the network's 900 topology prevents the construction of partially disjoint backup paths. Any creation of additional paths may completely overlap either the work path 906 or primary backup path 904.

Figure 10:
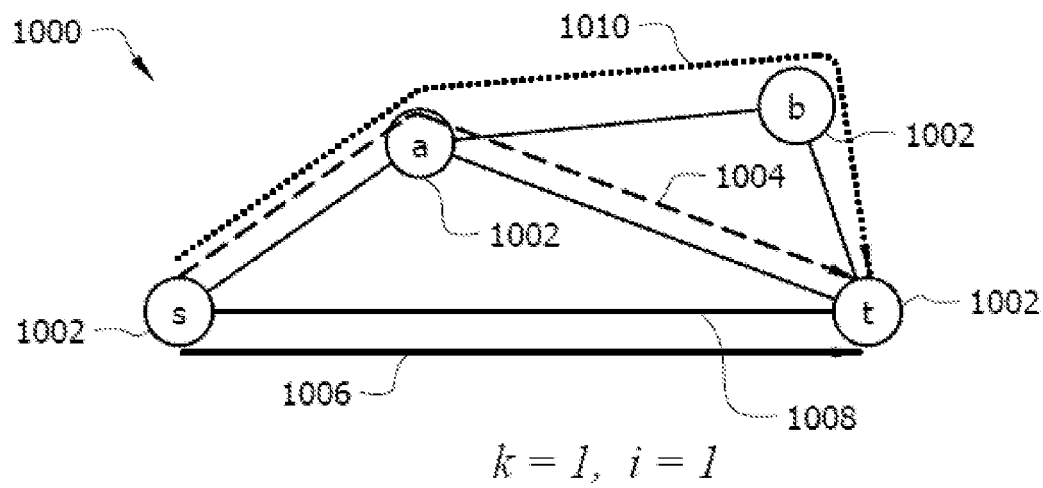
FIG. 10 is a schematic diagram of another embodiment of a network 1000 with a k value of one and an i value of one.

FIG. 10 is a schematic diagram of another embodiment of a network 1000 with a k value of one and an i value of one. Nodes 1002, primary backup path 1004, work path 1006, and paths 1008 are the same components as 902, 904, 906, and 908. FIG. 10 comprises two cut-pairs, [s-a], [s-t] and [a-b], [b-t]. Cut-pair [a-b], [b-t] may not include paths 1008 that overlap both the work path 1006 and secondary path 1004. As a result, network 1000 may have an k value of one because one cut-group [s-a], [s-t] may exist for network 1000. With the addition of node b 1002, one partially disjoint backup path 1010 may be constructed to protect against dual link failures. The partially disjoint backup path 1010 may transport data from node s 1002 to node t 1002 via node a and b 1002. No additional partially disjoint backup path 1010 may be created for network 1000, and thus the network may have an i value of one.

Figure 11:
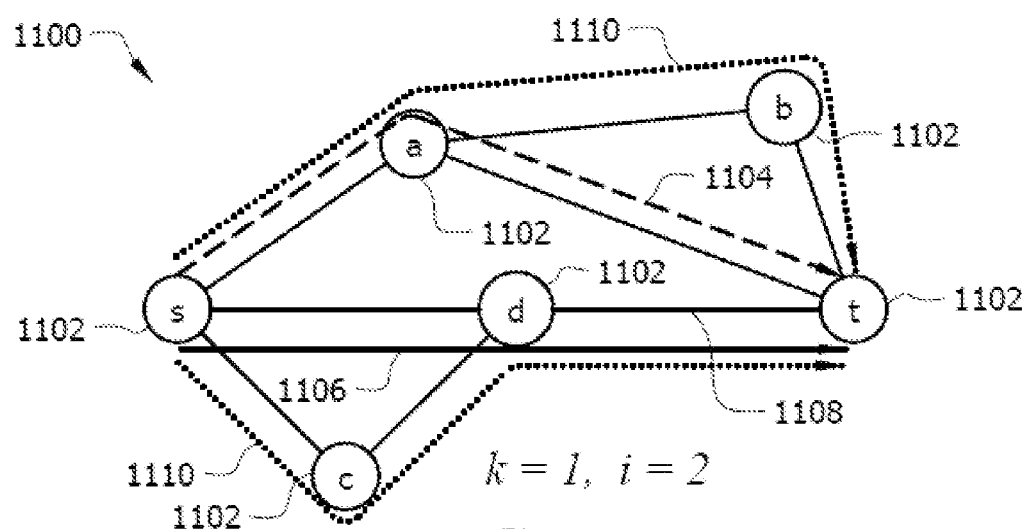
FIG. 11 is a schematic diagram of another embodiment of a network 1100 with a k value of one and an i value of two.

FIG. 11 is a schematic diagram of another embodiment of a network 1100 with a k value of one and an i value of two. Nodes 1102, primary backup path 1104, work path 1106, paths 1108, and secondary backup paths 1110 are the same components as 1002, 1004, 1006, 1008, and 1010. FIG. 11 illustrates network 1100 includes two sub-graph networks and one cut-pair [s-a], [d-t]. The first sub-graph network may and node a, b, and t 1102, while the second sub-graph network may comprise nodes s, c, and d 1102. As shown in FIG. 11, cut-pair [s-a], [d-t] may be the only cut-pair in network 1100, and thus represents the one cut-group. Two partially disjoint backup paths 1110 may be discovered for the data flow between node s 1102 and node t 1102. Similar to FIG. 10, one partially disjoint backup path 1110 may transport data from node s 1102 to node t 1102 via node a and b 1102. An additional secondary backup path 1110 may be discovered and constructed with the addition of nodes c and d 1102. The additional secondary backup path 1110 may transport data from node s 1102 to node t 1102 via nodes c and d 1102. A dual link failure at the cut-pair/cut-group may separate the two sub-graph networks from each other.

Figure 12:
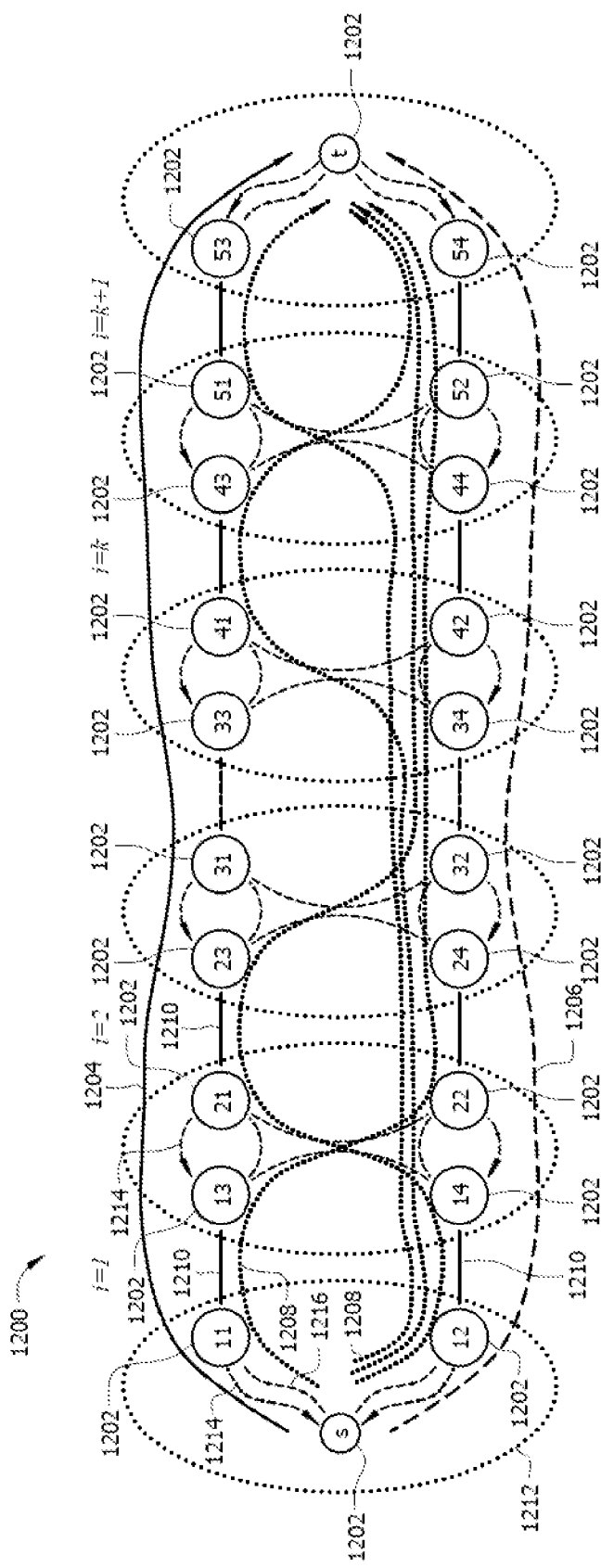
FIG. 12 is a schematic diagram of embodiment of a network 1200 where the number of cut-groups or k value is greater than two.

FIG. 12 is a schematic diagram of embodiment of a network 1200 where the number of cut-groups or k value is greater than two. Nodes 1202, work path 1204, primary backup path 1206, secondary backup paths 1208, single path 1210, sub-graph networks 1212, path 1214, bi-connected path 1216 are the same has components 404, 502, 512, 616, 406, 408, 514, and 410 as shown in FIG. 8. Node s 1202 may be designated the source node and node t 1202 may be designated the destination node. Network 1200 may initially have k cut-groups listed in order based on proximity from the source node (i.e., node s 1202). Each cut-group may have halves that correspond to single paths 1210. For example, FIG. 12 may initially include the following cut-groups listed as: {[11-13], [12-14]; [21-23], [22-24]; ... [41-43], [42-44]}. The $k^{th}$ cut-group may be [41-43], [42-44], where the first half of the cut-group corresponds to single path [41-43] 120 and the second half corresponds to the single path [42-44] 120. Single paths 1210 located on the top-half of the network may be used to construct the work path 1204, while the single paths 1210 located on the bottom half of the network 1200 may be used to construct the primary backup path 1206.

Network 1200 may also include i=k secondary backup paths 1208. The first halves of each cut-group (e.g. [11-13]) may overlap the work path 1204, while the second halves of all other cut-group (e.g. [12-14]) may overlap the primary backup path 1206. Each cut-group may have a secondary backup path 1208 (i.e., a partially disjoint backup path) constructed to pass through the first half of one cut-group and the second halves of all other cut-groups. For example, the first secondary backup path 1208 (i.e., i=1) may be routed to pass through the first half of cut-group [11-13], [12-14] and the second halves of the remaining cut-groups, [21-23], [22-24]; ... [41-43], [42-44]. The second secondary backup path 1208 (i.e., i=2), may pass through the first half of cut-group [21-23], [22-24]; and the second halves all other cut-groups, [11-13], [12-14]; ... [41-43], [42-44]. The $k^{th}$ secondary backup path 1208 (i.e., i=k) may be routed to pass through the second halves of all prior listed cut-groups and pass through the first half of the $k^{th}$ cut-group [41-43], [42-44]. Hence, when 2≤i≤k, the $i^{th}$ secondary backup path may pass through single paths 1210 in the first half of the k=i cut group and single paths 1210 in the second halves of other cut-groups.

After initially constructing k secondary backup paths, an additional cut-group k+1 may be provisioned to network 1200. An additional secondary backup path (e.g. i=k+1) may be constructed to protect the k+1 cut-group. A secondary backup path 1208 may be constructed such that the secondary backup path 1208 may pass through the first half of the k+1 cut group and the second halves of all other cut-groups. In FIG. 12, the k+1 secondary backup path 1208 (i.e. i=k+1) may be routed to pass through the first half of k+1 cut-group [51-53], [52-54], and pass through the second halves of the other cut-groups [11-13], [12-14]; [21-23], [22-24]; . . . [41-43]. Persons of ordinary skill in the art are aware that other methods may discover and construct the secondary backup paths 1208 by routing the secondary backup paths 1208 through more than one first halves of a cut-group. For example, the secondary backup path 1208 may be constructed to pass through two first halves of [11-13], [12-14]; [21-23], [22-24]; and the second halves of all other cut-groups. Less than k secondary backup paths 1208 may be used to protect network 1200. Moreover, the partially disjoint backup paths may be constructed in other types of networks, such as tri-connected network.

Figure 13:
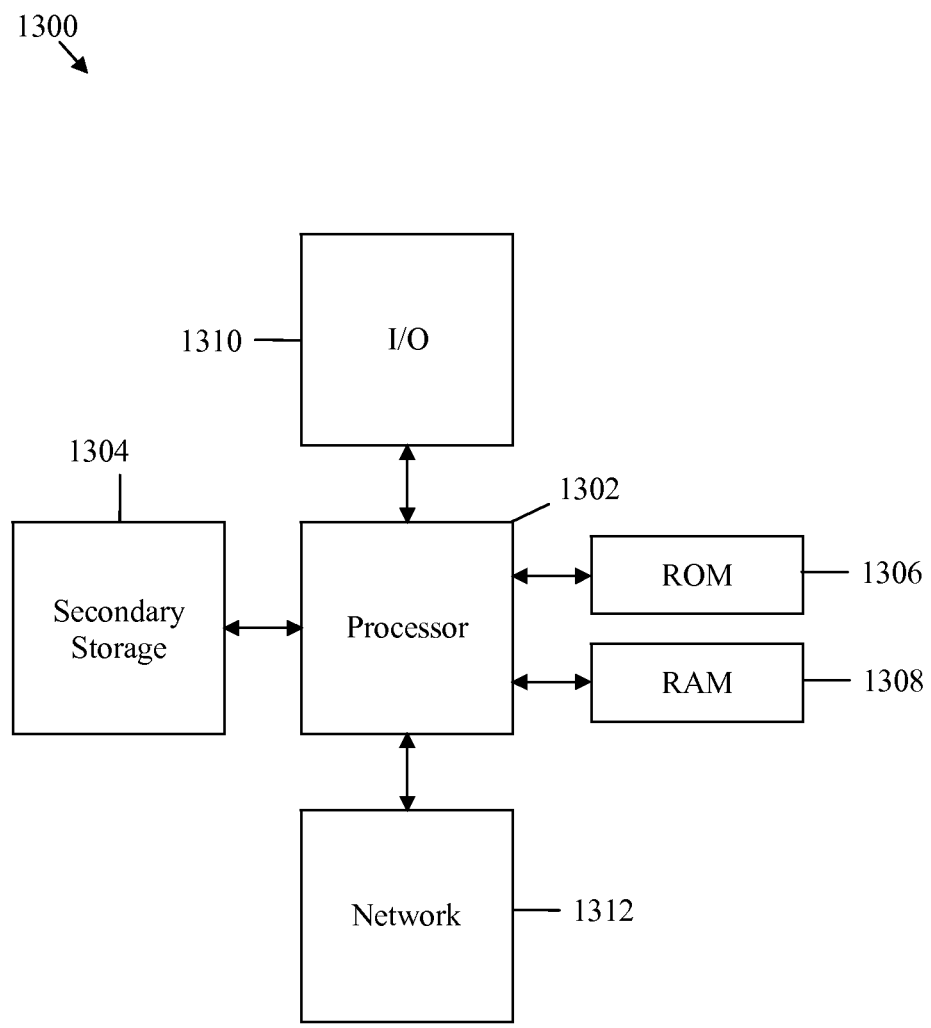
FIG. 13 is a schematic diagram of one embodiment of a general-purpose computer system suitable for implementing the several embodiments of the disclosure.

FIG. 13 illustrates a typical, general-purpose network component 1300 that may correspond to or may be part of the nodes described herein, such as a server, a switch, a router, or any other network nodes. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The general-purpose network component 1300 may also comprise, at the processor 1302 and or any of the other components of the general-purpose network component 1300.

The processor 1302 may be implemented as one or more CPU chips, or may be part of one or more application specific integrated circuits (ASICs) and/or digital signal processors (DSPs). The processor 1302 may comprise a central processor unit or CPU. The processor 1302 may be implemented as one or more CPU chips. The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a processor configured to:
find a first cut-pair for a network comprising a plurality of nodes;
find a second cut-pair for the network; and
merge the first cut-pair and the second cut-pair into a cut-group when the first cut-pair and the second cut-pair overlap with each other,
wherein failure of all paths in either the first cut-pair or the second cut-pair partitions the network,
wherein after the partition of the network, some of the nodes cannot communicate with other of the nodes, and
wherein the network is a bi-connected network that provides at least two fully disjoint paths between any two of the nodes within the network, and wherein a data flow comprises the first cut-pair and the second cut-pair.

2. The apparatus of claim 1, wherein the first cut-pair comprises a first path and a second path, wherein the second cut-pair comprises a third path and a fourth path, and wherein the processor is further configured to merge the first cut-pair and second cut-pair into the cut-group when the first path overlaps either the third path or the fourth path.

3. The apparatus of claim 2, wherein the processor is further configured to merge the first cut-pair and the second cut-pair into the cut-group when the second path overlaps either the third path or the fourth path.

4. The apparatus of claim 1, wherein the cut-group comprises a first half path and a second half path, wherein the first half path overlaps a work path, and wherein the second half path overlaps a primary backup path.

5. The apparatus of claim 1, wherein the cut-group overlaps a work path and a primary backup path.

6. The apparatus of claim 1, wherein a failure of the first cut-pair partitions the network into a first sub-graph network and a second sub-graph network, wherein the first sub-graph network comprises a first subset of nodes within the network, wherein the second sub-graph network comprises a second subset of nodes within the network, and wherein the first subset of nodes communicate with each other independently of the second subset of nodes.

7. The apparatus of claim 1, wherein the processor is further configured to:
find a third cut-pair; and
merge the first cut-pair, the second cut-pair, and the third cut-pair when the third cut-pair overlaps either the first cut-pair or the second cut-pair.

8. The apparatus of claim 1, wherein the first cut-pair is the cut-group when the first cut-pair does not overlap with the second cut-pair.

9. The apparatus of claim 1, wherein the cut-group comprises a first half path and a second half path, and wherein a partially disjoint backup path overlaps the first half path and not the second half path.

10. The apparatus of claim 1, wherein each of the nodes corresponding to the cut-group is communicatively coupled to a single neighbor node.

11. An apparatus comprising:
a processor configured to:
find a first cut-pair for a network comprising a plurality of nodes;
find a second cut-pair for the network; and
merge the first cut-pair and the second cut-pair into a cut-group when the first cut-pair and the second cut-pair overlap with each other,
wherein failure of either the first cut-pair or the second cut-pair partitions the network, and wherein after the partition of the network, some of the nodes cannot communicate with other of the nodes,
wherein the first cut-pair comprises a first path and a second path, wherein the second cut-pair comprises a third path and a fourth path, and wherein the processor is further configured to merge the first cut-pair and the second cut-pair into the cut-group when the first path overlaps either the third path or the fourth path,
wherein the processor is further configured to merge the first cut-pair and the second cut-pair into the cut-group when the second path overlaps either the third path or the fourth path, and
wherein the cut-group comprises a first half path and a second half path, wherein the first half path indicates the first path merged with either the third path or the fourth path, and wherein the second half path indicates the second path merged with either the third path or the fourth path.

12. An apparatus comprising:
a processor configured to:
discover a first fully disjoint path and a second fully disjoint path for a data flow, wherein the first fully disjoint path and the second fully disjoint path do not overlap with each other;
find a plurality of cut-pairs for the data flow;
combine the cut-pairs into a plurality of cut-groups, wherein each of the cut-groups comprise a first half and a second half; and
construct a first partially disjoint backup path that overlaps one of the halves for each cut-group,
wherein the processor is further configured to construct a second partially disjoint backup path by alternating the halves for each cut-group.

13. The apparatus of claim 12, wherein the first partially disjoint backup path overlaps segments of the first fully disjoint path, and wherein the first partially disjoint backup path overlaps segments of the second fully disjoint path.

14. The apparatus of claim 12, wherein the first partially disjoint backup path overlaps the first half of a first cut-group, and wherein the first partially disjoint backup path overlaps the second half of the remaining cut-groups.

15. The apparatus of claim 12, wherein the processor is further configured to limit the forwarding ability for a plurality of links along the first fully disjoint path and the second fully disjoint path.

16. A method for protecting a bi-connected network against a dual link failure, the method comprising:
finding a plurality of cut-pairs for a data flow;
finding a work path and a primary backup path for the data flow;
determining the cut-pairs that overlap both the work path and the primary backup path;
merging the cut-pairs that overlap the work path and the primary backup path into a plurality of cut-groups, wherein each cut-group comprises a first half and a second half; and
constructing a plurality of partially disjoint backup paths based on the cut-groups,
wherein one of the partially disjoint backup paths protects against the dual link failure that causes a failure on the second half of a first cut-group and a failure on the first half of a second cut-group,
wherein the dual link failure comprises a failure of all links in one of the cut-pairs, and
wherein the number of cut-groups in the data flow equals the number of partially disjoint backup paths constructed for the data flow.

17. The method of claim 16, wherein a first partially disjoint backup path overlaps the first half of the first cut-group, and wherein the first partially disjoint backup path overlaps the second half of the rest of the cut-groups for the data flow.

18. The method of claim 17, wherein a second partially disjoint backup path overlaps the first half of the second cut-group, and wherein the second partially disjoint backup path overlaps the second half of the first cut-group.

* * * * *